United States Patent [19]

Hoeffken

[11] Patent Number: 4,547,943
[45] Date of Patent: Oct. 22, 1985

[54] METHOD OF MANUFACTURING A HEAT EXCHANGER AND PLATE ASSEMBLY

[75] Inventor: Russell W. Hoeffken, Belleville, Ill.

[73] Assignee: Snyder General Corporation, Red Bud, Ill.

[21] Appl. No.: 329,778

[22] Filed: Dec. 11, 1981

Related U.S. Application Data

[62] Division of Ser. No. 178,337, Aug. 15, 1980, abandoned.

[51] Int. Cl.[4] ............... B23P 15/26; B21D 39/06; F24H 9/14
[52] U.S. Cl. .................. 29/157.3 R; 29/507; 29/157.3 C; 29/157.4; 126/119; 285/47; 285/382.4; 285/222; 165/178
[58] Field of Search ............. 126/119; 29/157.3 C, 29/157.4, 157.5, 507, 157.3 R; 165/178; 285/47, 382.4, 222

[56] References Cited

U.S. PATENT DOCUMENTS

| 167,339 | 8/1875 | Jerrold | 126/119 |
| 683,670 | 10/1901 | Tinkham | 126/119 |
| 737,494 | 8/1903 | Sanborn | 126/119 |
| 1,005,760 | 10/1911 | Workman | 29/157.5 |
| 1,406,875 | 2/1922 | Kreutzberg | 126/119 |
| 2,164,629 | 7/1939 | Sibley | 29/157.5 |
| 2,401,502 | 6/1946 | Olds | 126/99 |
| 2,464,506 | 3/1949 | Hirschfield | 285/49 |
| 2,923,349 | 2/1960 | Marble | 126/119 |
| 3,696,862 | 10/1972 | Van Dijk | 29/157.4 |
| 3,908,629 | 9/1975 | Wiese | 126/119 |
| 3,940,837 | 3/1976 | Wiese | 126/119 |
| 4,233,726 | 11/1980 | Williams | 29/727 |
| 4,245,960 | 1/1981 | Matthews | 416/244 |
| 4,369,569 | 1/1983 | Armstrong, Jr. | 29/726 |
| 4,400,965 | 8/1983 | Schey | 72/334 |

FOREIGN PATENT DOCUMENTS

1285511 8/1972 United Kingdom .......... 29/157.3 C

OTHER PUBLICATIONS

"The Soldering of Sheet-Metal Heat Exchangers", Report of Symposium, Apr. 30, 1965, published by Tin Research Institute, Freser Rd., Greenford, Middlesex.

Primary Examiner—Howard N. Goldberg
Assistant Examiner—Vernon K. Rising
Attorney, Agent, or Firm—Hubbard, Thurman, Turner & Tucker

[57] ABSTRACT

A plate assembly is secured to a heat exchanger unit for a hot air furnace at each of one or more apertures in the unit by expanding a flange extending around an aperture on the plate within the aperture in the unit to cause such flange to conform to the exact shape of the aperture in the unit and form a leak-proof joint between the heat exchanger unit and plate assembly.

10 Claims, 8 Drawing Figures

METHOD OF MANUFACTURING A HEAT EXCHANGER AND PLATE ASSEMBLY

This application is a division of application Ser. No. 178,337 filed Aug. 15, 1980 now abandoned.

BACKGROUND OF THE INVENTION

1. Field of the Invention

The invention relates to gas-fired furnaces and more particularly to heat exchanger and plate assemblies for use in a gas-fired furnace.

2. Description of the Prior Art

Heat exchanger units for use in gas-fired furnaces generally include an opening in a lower pouch section for insertion of a gas burner, and an exit opening for flue gases in an upper section. A pouch plate and partition plate are generally secured over the pouch area and upper section respectively of each heat exchanger unit, after which the plates are secured in a leak proof joint to the sides of the furnace to isolate air heated by the heat exchangers in the rear of the furnace from furnace controls in the front.

It has been customary to weld the pouch plate and partition plate to the heat exchanger units. However, the welding operation is costly. Furthermore, the resulting structure lacks structural integrity because of stresses which are introduced during the welding process and which are aggravated by expansion and contraction of the metal of the heat exchanger unit during on and off cycles of the furnace. Another disadvantage of welding is the presence of noxious fumes which are produced during the welding process, and which result not only in a loss of comfort and healthful air in the vicinity of activity within a manufacturing facility, but result in an increased level of pollution of outside air into which the fumes must ultimately be expelled.

It has been proposed to avoid the need for welding by providing mounting flanges on the heat exchangers at the openings therein, and also on the pouch and partition plates, and then securing these flanges together with fastening means such as screws. However, this is a time consuming assembly technique which often results in distortion of the assembled parts. Also, the parts tend to work loose when subjected to expansion and contraction during on and off cycles of the furnace. Another technique, disclosed in U.S. Pat. Nos. 3,908,629 and 3,940,837 of The Singer Company, avoids welding by providing mounting flanges on the heat exchanger at the openings and folding such flanges back onto the plate members while entrapping sheet insulating material to complete the attachment and seal. However, such technique does not permit the application to heat exchangers of a brittle coating such as porcelain enamel, often times desirable for the purpose of enhancing corrosion resistant properties of heat exchangers and improving their heat transfer characteristics.

It is an object of this invention to provide an improved no-weld construction having high structural integrity for a heat exchanger unit and plate assembly.

It is another object of the invention to provide an improved no-weld construction for a heat exchanger unit and plate assembly wherein it is required that the heat exchanger unit shall include a brittle corrosion resistant and heat transfer coating.

It is still another object of the invention to provide an improved no-weld method of joining a heat exchanger unit to a plate at each of one or more pairs of aligned apertures in the unit and plate by expanding a flange on the plate within the aperture in the heat exchanger unit.

Other objects and advantages of the invention will become apparent hereinafter.

SUMMARY OF THE INVENTION

A plate is secured in accordance with the invention without welds to a heat exchanger unit for a hot air furnace at aligned openings in the unit and plate. The plate and unit are joined at such openings in accordance with the invention with a plate flange expanded so as to conform to the exact shape of the opening in the unit and form a leak proof point between the plate and heat exchanger unit.

DESCRIPTION OF THE INVENTION

Figures 1, 2:
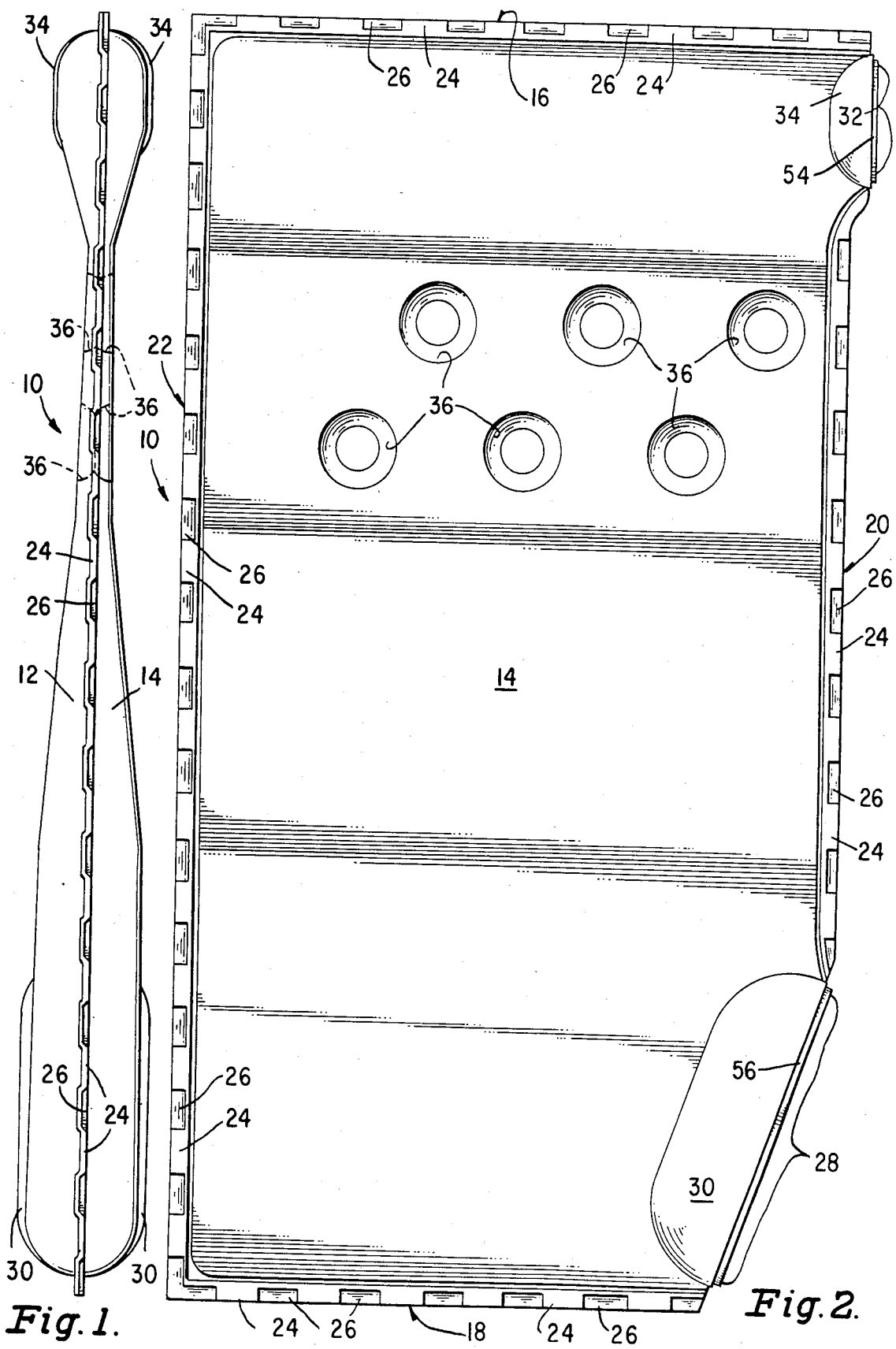
FIG. 1 is a rear elevational view of a heat exchanger unit for a gas-fired furnace.
FIG. 2 is a side elevational view of the heat exchanger unit.

Referring to the drawings, reference character 10 designates a gas furnace heat exchanger unit including clam shell sides 12 and 14 which are joined along top, bottom, front and rear edges 16, 18, 20 and 22 respectively. The sides are preferably joined along each such edge with overlapping flanges crimped and sealed in at least two different planes as at 24 and 26 in the manner disclosed in my copending patent application for "Heat Exchanger Unit and Method of Manufacture" U.S. Pat. No. 4,298,061.

As shown, the heat exchanger unit 10 includes an opening 28 in a lower pouch section 30 for the reception of means such as a gas burner (not shown) for firing the unit, and includes a smoke exit opening 32 in an upper section 34 of the unit. Reference character 36 designates depressions formed in the sides of the heat exchanger unit to prevent closure of the heated chamber during the heating cycle. The heat exchanger unit may be provided with a coating to improve the corrosion resisting and heat transfer capability of a furnace wherein the unit is to be utilized.

One or more heat exchanger units 10 is securable, in accordance with the invention, to a partition plate and pouch plate to provide an assembly which can be affixed to the sides of a hot air furnace to isolate air to be heated in the rear of the furnace from controls in the front.

Figure 3:
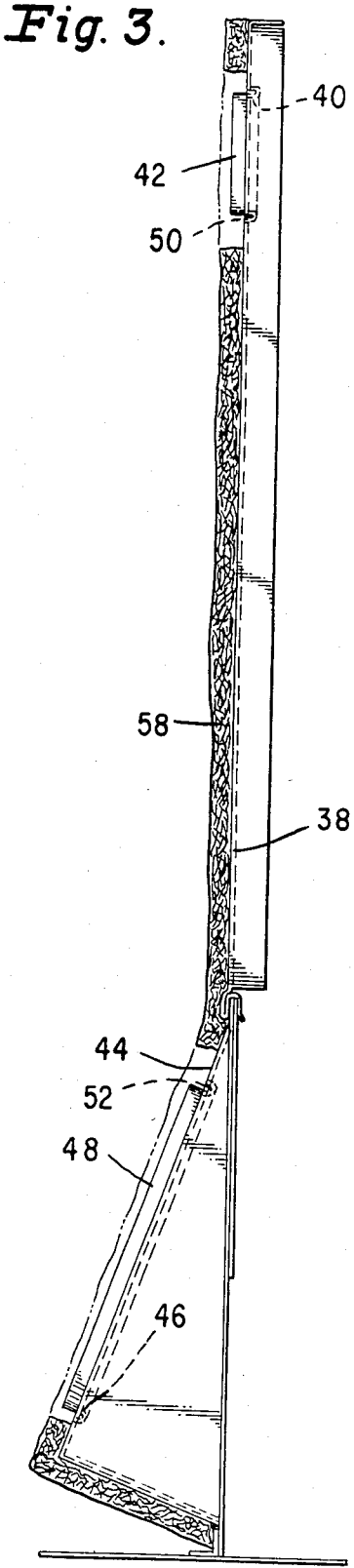
FIG. 3 is a side elevational view of a plate construction to which the heat exchanger unit attaches according to the invention.
Figure 4:
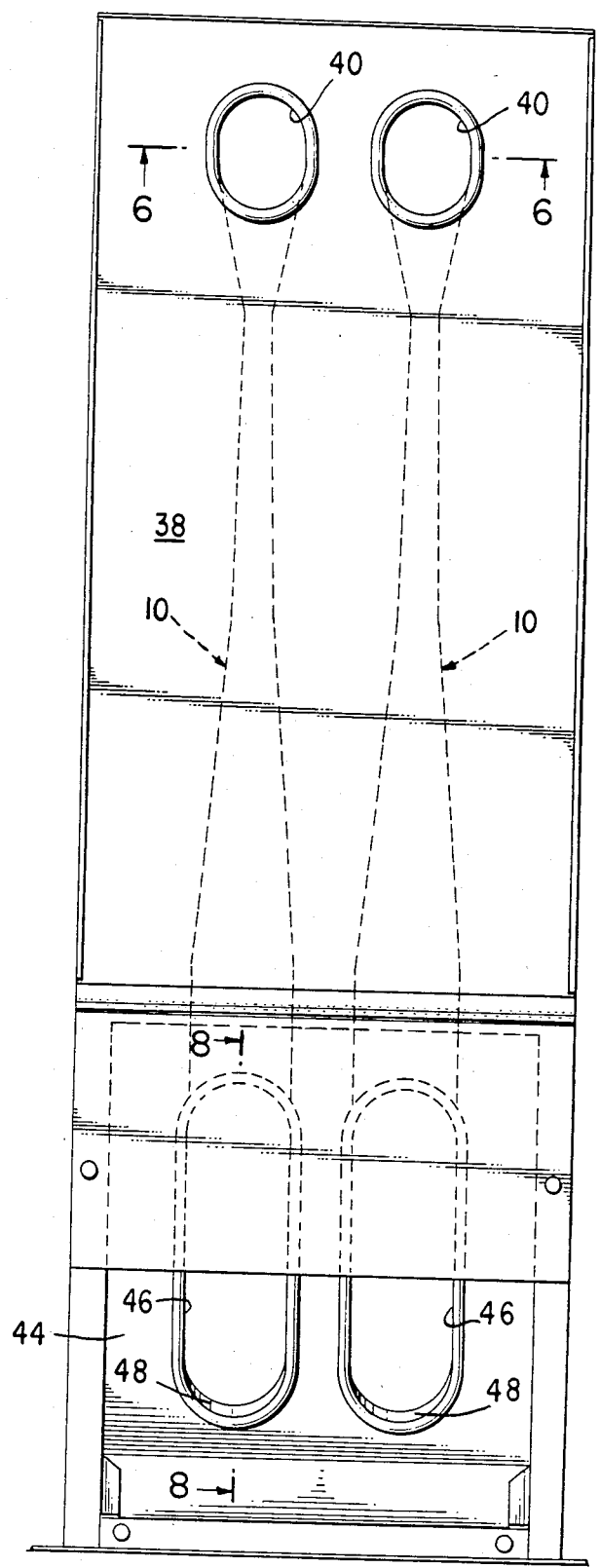
FIG. 4 is a front elevational view showing the plate construction with heat exchanger units attached thereto.
Figure 5:
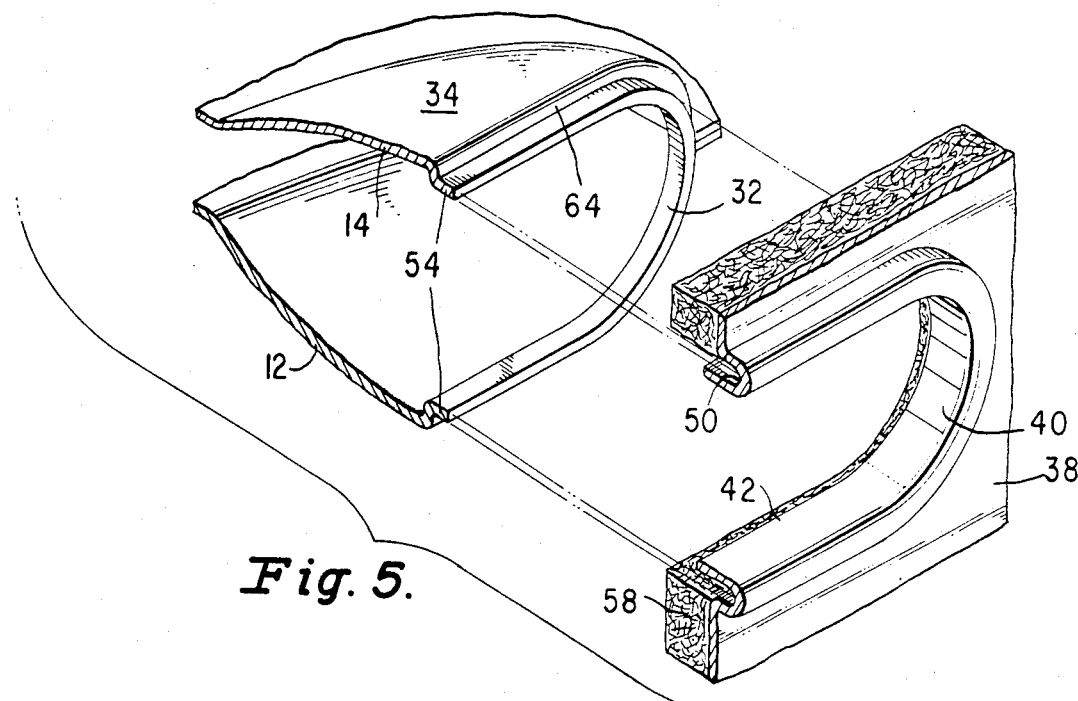
FIG. 5 is a fragmentary exploded perspective view showing attaching portions of a partition plate and heat exchanger unit at a smoke exit.
Figure 6:
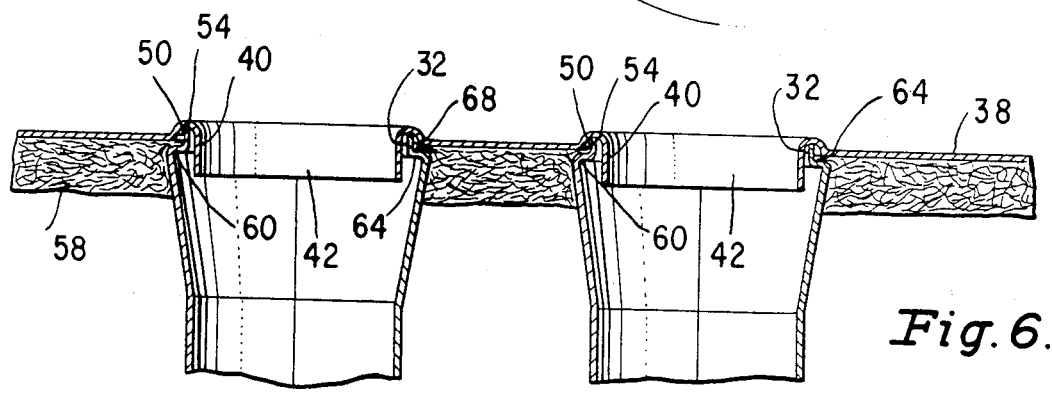
FIGS. 6 and 7 are sectional views taken on the plane of the line 6—6 of FIG. 4 illustrating steps in the formation of a leak-proof joint at a smoke exits.
Figure 7:
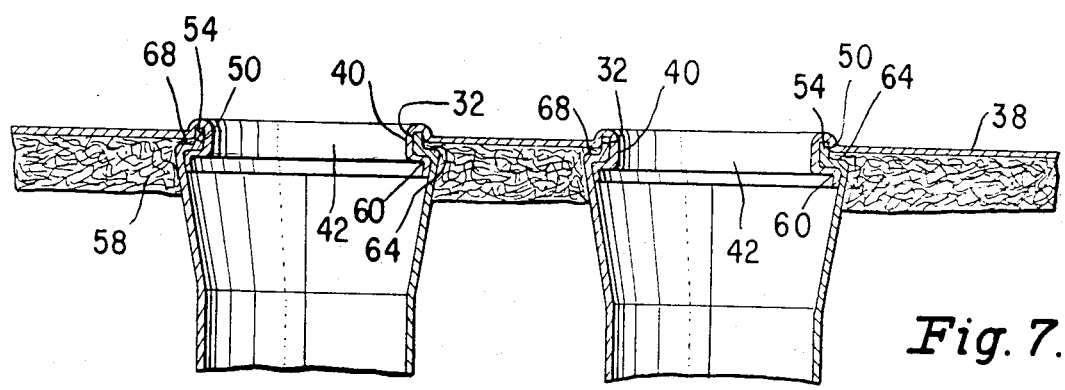
Figure 8:
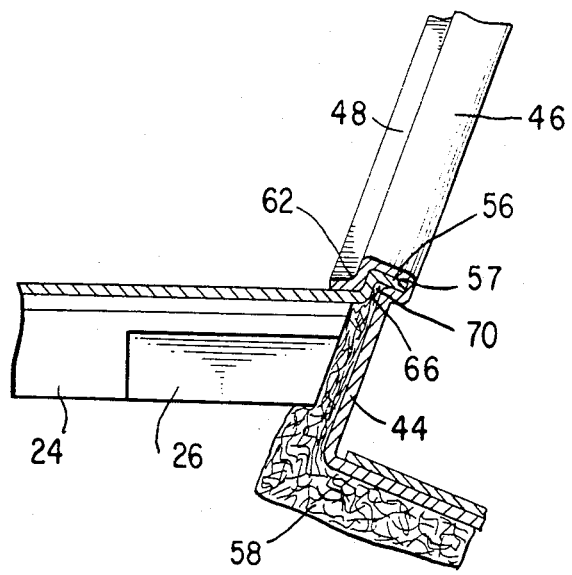
FIG. 8 is a sectional view taken on the plane of the line 8—8 of FIG. 4 at a pouch plate opening.

Referring to FIGS. 3 and 4, there may be seen a partition plate 38 including openings 40 defined by rearwardly projecting mounting flanges 42, and a pouch plate 44 including openings 46 defined by rearwardly projecting mounting flanges 48. The plate openings 40 and 46 generally correspond in shape and size to the heat exchanger openings 32 and 28 respectively and can be aligned therewith. Mounting flange 42 at each opening 40 bends away from the surface of plate 38 and into the opening 40 forming an annular trough 50. Similarly, a mounting flange 48 at each opening 46 bends away from the surface of plate 44 and into the opening 46 forming an annular trough 52. Projecting edge rims 54 at heat exchanger openings 32 are received in the annular troughs 50 at partition plate openings 40 (FIGS. 5, 6 and 7), and projecting edge rims 56 at heat exchanger openings 28 are received in annular troughs 57 at pouch plate openings 46 (FIG. 8).

In designs requiring insulation between the plates 38, 44 and heat exchanger units, insulating material 58, which is preferably fiberglass sheet material provided with openings for the rims 54 and 56, is secured as with a suitable adhesive to the rear side of plates 38 and 44 before any heat exchanger unit is assembled to the plates. With the insulating material in place, heat exchanger units 10 are each secured to plates 38 and 44 by first fitting the mounting flanges 42 and 48 on the plates into openings 32 and 28 respectively in the heat exchanger unit while causing rims 54 and 56 to enter the troughs 50 and 57 (as in the manner shown in FIG. 6 at the openings 32), and by then expanding the plate flanges in the openings wherein they have been located to thereby form a seal with the heat exchanger (as illustrated in FIG. 7 for flanges 42 and in FIG. 8 for flanges 48).

The walls of the heat exchanger units at openings 40 and 46 extend outwardly from rims 54 and 56 to annuli at 60 and 62 respectively, and include portions 64 and 66 extending substantially parallel to the plates 38 and 44 respectively. When the flanges are expanded, they are forced tightly against and around the annuli to form leak proof joints. A small amount of insulating material 58 may thereby be compressed between the plates and parallel wall portions, as at 68 and 70 without being caused to protrude into the heat exchanger chamber or interfere with the seal and without reducing in any substantial way the full cross sectional area of the insulating material around the openings in the plates and heat exchanger units.

The force required to conform the partition plate and pouch plate mounting flanges 42 and 48 to the inside surfaces of the openings in the heat exchanger units can be readily controlled to prevent damage to any brittle coating such as porcelain enamel applied to the heat exchanger units. This is in contrast to other designs, such as disclosed for example in U.S. Pat. Nos. 3,908,629 and 3,940,837 for "Hot Air Furnace with Improved Heat Exchanger Construction" issued Sept. 30, 1975 and Mar. 2, 1976 respectively, requiring flange portions of the heat exchanger units to be expanded in a manner which would result in damage to any brittle coating thereon. In such other designs, it is necessary, when a brittle coating on heat exchanger units is called for, to coat an assembly of the units with a partition and pouch plate, and if the coating turns out to be unsatisfactory, the whole assembly must be rejected. With the design of the present invention, only the heat exchanger units need be coated prior to assembly.

It is to be understood that the partition plate 38 and pouch plate 44 may be simultaneously or separately assembled to heat exchanger units 10. If assembled simultaneously, a single sheet of insulating material with smoke and pouch openings can be applied to the plates after they are suitably secured to each other. If assembled separately, each plate can be provided with a section of insulating material having the openings required for its application. In any event, the fiberglass material may be provided with a foil facing to reflect heat from the heat exchangers and so enable the maintenance of a lower temperature on the plates.

Any of various well known types of expander devices may be used to expand the flanges at the smoke and pouch openings. Such devices may, for example, be of the hydraulic type and have single or multi-stroke capability, and when necessary, a conventional expander may be modified to accommodate the dimensions and configurations of the smoke and pouch openings.

In designs without insulation between the plates and heat exchanger units, there is direct metal to metal contact at 68 (FIG. 7) and 70 (FIG. 8) and the integrity of the leak proof joints is preserved without the entrapment of insulation at these locations.

While the present disclosure relates to preferred embodiments of the invention, it is for purposes of illustration only and is not to be construed as a limitation of the invention. Numerous alterations and modifications of the structure herein disclosed will suggest themselves to those skilled in the art and all such modifications and alterations which do not depart from the spirit and scope of the invention are intended to be included within the scope of the appended claims.

I claim:

1. A method of joining a heat exchanger for a furnace to a partition plate member comprising the steps of:

providing said heat exchanger in the form of a pair of opposed sheet metal clamshell sections joined together along cooperating edges to form a generally closed combustion chamber having spaced apart burner and smoke outlet openings, respectively, a wall extending generally radially outwardly from each of said openings in said heat exchanger around the periphery of said openings in said heat exchanger and a peripheral rim projecting generally perpendicular to each of said walls and delimiting each of said openings in said heat exchanger;

providing a partition plate comprising a generally planar member having spaced apart openings formed therein corresponding to said openings in said heat exchanger, respectively, each of said openings in said plate being defined by a continuous circumferential flange projecting from a surface of said plate;

inserting said flanges through said openings in said heat exchanger toward said chamber from the exterior of said heat exchanger; and expanding said flanges radially outwardly relative to said openings to force said flanges into engagement with said rims and said walls, respectively, and without materially deforming said rims and said walls to form rigid leakproof joints between said heat exchanger and said plate.

2. A method of joining a heat exchanger for a furnace to a partition plate member comprising the steps of:

providing said heat exchanger in the form of a pair of opposed sheet metal clamshell sections joined together along cooperating edges to form a generally closed combustion chamber having spaced apart burner and smoke outlet openings, respectively, a wall extending radially outwardly from each of said openings in said heat exchanger and around the periphery of said openings in said heat exchanger, respectively, and a peripheral rim projecting generally perpendicular to each of said walls and delimiting each of said openings in said heat exchanger;

providing a partition plate comprising a generally planar member having spaced apart openings formed therein corresponding to said openings in said heat exchanger, respectively, each of said openings in said plate being defined by a continuous circumferential flange projecting from a surface of said plate and defining an annular trough formed by a portion of said flange which extends away from the plane of said plate and back into said opening in said plate;

applying a brittle coat to said heat exchanger;

inserting said flanges through said openings in said heat exchanger toward said chamber from the exterior of said heat exchanger with said rims projecting into said troughs, respectively; and expanding said flanges radially outwardly relative to said openings to force said flanges into engagement with said rims and said walls without materially deforming said rims and said walls to trap said rims in said troughs, respectively, to form rigid leak-proof joints between said heat exchanger and said plate.

3. A method of joining a heat exchanger for a furnace to a partition plate member comprising the steps of:

providing said heat exchanger in the form of a pair of opposed sheet metal clamshell sections joined together along cooperating edges to form a closed combustion chamber having at least one opening intersecting said edges and a wall extending generally radially outwardly from said one opening around the periphery of said one opening;

providing a partition plate comprising a generally planar member having an opening formed therein corresponding to said one opening and defined by a continuous seamless circumferential flange projecting from a surface of said plate;

inserting said flange through said one opening toward said chamber from the exterior of said heat exchanger; and expanding the peripheral edge of said flange radially outwardly relative to said openings to force said flange into engagement with said wall and without materially deforming said wall to form a rigid leak-proof joint between said heat exchanger and said plate.

4. The method of claim 3 which includes squeezing insulating material between said plate and said heat exchanger during the expansion of said flange.

5. The method of claim 4 wherein said insulating material is squeezed into a plane substantially parallel to the plane of said plate.

6. The method of claim 3 which includes applying a brittle corrosion resisting heat transfer coating to said heat exchanger prior to said plate and heat exchanger being joined at said openings.

7. The method of claim 3 which includes applying a procelain enamel coating to said heat exchanger prior to said plate and said heat exchanger being joined at said openings.

8. The method set forth in claim 3 wherein:

said flange is expanded by bending a portion of said flange into a plane generally parallel with the plane of said plate.

9. The method set forth in claim 8 wherein:

said heat exchanger includes a rim projecting from said wall and delimiting said one opening, and said step of expanding said flange includes expanding a portion of said flange into engagement with said rim.

10. The method set forth in claim 9 wherein:

said flange includes an annular trough formed by a portion of said flange which extends away from the plane of said plate and back into said opening in said plate, and said method includes the step of inserting said rim into said trough prior to bending said flange outwardly to trap said rim in said trough.

* * * * *